Sept. 6, 1927.  1,641,927
F. J. GREMEL
MOLD FASTENER
Filed Aug. 19, 1926   2 Sheets-Sheet 1
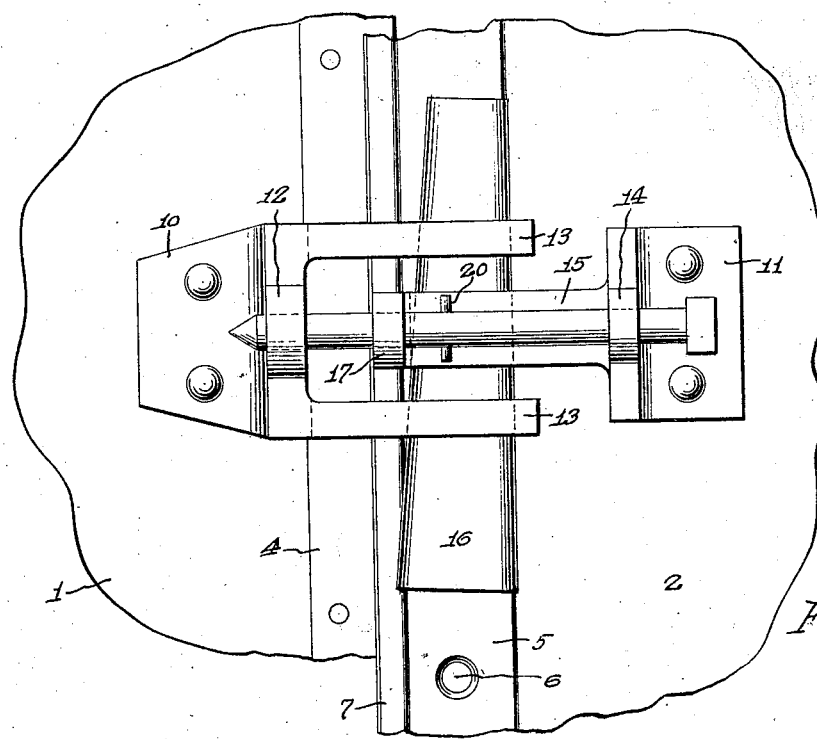
Fig.1.
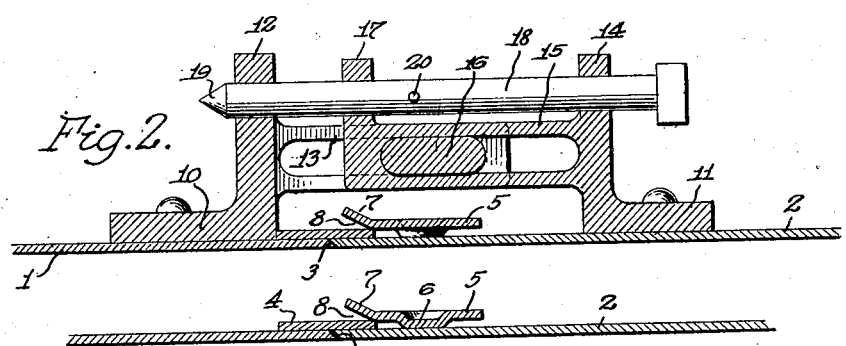
Fig.2.
Fig.3.
Fig.4.
Inventor
Frank J. Gremel,
By
Attorneys

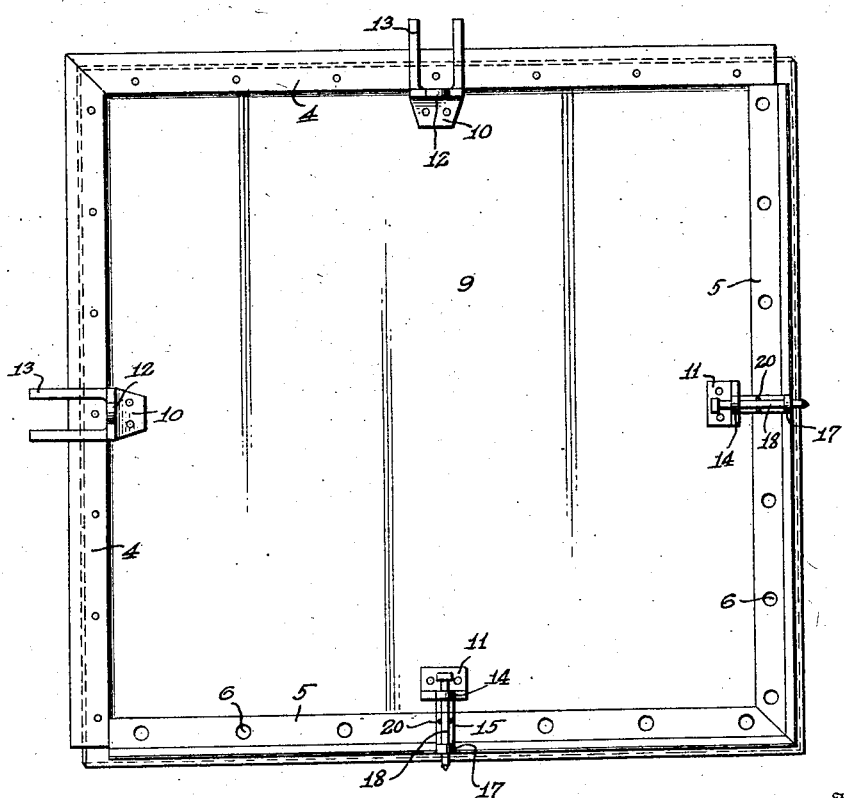

Patented Sept. 6, 1927.

1,641,927

UNITED STATES PATENT OFFICE.

FRANK J. GREMEL, OF DETROIT, MICHIGAN.

MOLD FASTENER.

Application filed August 19, 1926. Serial No. 130,175.

The primary object of my invention is to provide a mold wall fastener that may be advantageously used for a lining and connecting superposed metallic mold walls, panels or the like used in the formation of walls and other structures formed from plastic material, as concrete.

Another object of this invention is to provide a mold wall fastener embodying wedge connected members which are constructively arranged so that one member may be adjusted laterally or vertically relative to the other member, thus permitting of a mold wall panel or the like being adjusted and manipulated relative to adjoining mold walls or panels. This is essential in order that mold walls may be assembled relative to one another to form a mold cavity, particularly where the mold walls are at an angle relative to each other.

A further object of this invention is to provide interlocking members for the adjoining edges of mold walls, said members permitting of one wall being easily and accurately seated on the other wall, and one of said interlocking members prevents the accumulation of water at said interlocking members to cause rust which might interfere with the joining of the mold walls.

The above and other objects are attained by a simple and durable fastener that will be hereinafter specifically described and then claimed, and reference will now be had to the drawings, wherein Figure 1 is a front elevation of a mold wall fastener in accordance with this invention;

Fig. 2 is a longitudinal sectional view of the same;

Fig. 3 is a detail sectional view of the interlocking members of mold walls;

Fig. 4 is an edge view of one of the interlocking members;

Fig. 5 is a horizontal sectional view of mold walls connected in accordance with this invention and arranged to provide a mold cavity, and Fig. 6 is a front elevation of a mold wall or panel equipped with fasteners in accordance with this invention.

In the drawings, 1 and 2 denote adjoining mold walls, panels or the like which have confronting edges beveled or cut on a bias, as at 3.

Riveted, spot welded or otherwise secured to the beveled edge of a wall 1 is a strip member 4 and likewise secured to the wall 2, adjacent the beveled edge thereof, is a strip member 5. This member has a plurality of depressions or bosses 6 which are secured to the wall 2 to maintain the strip member 5 in spaced relation to said wall so as to provide a drain space between the strip member 5 and the wall 2. That edge of the strip member 5 adjacent the edge of the wall 2 is flared outwardly or flanged, as at 7, to cooperate with the wall 2 in forming a longitudinal pocket 8 to receive the edge of the strip 4, the strips 4 and 5 interlocking and cooperating in maintaining the walls 1 and 2 in a common plane so that said walls cannot become accidentally displaced relative to each other, particularly by pressure exerted at the inner side of either wall. These interlocking strips are adapted to extend throughout the length of any edges of a wall or panel, but according to Fig. 6, it is preferable to provide a panel 9 with two of the strip members 4 and two of the strip members 5, the strip members 5 being arranged in opposed relation to the strip members 4 to facilitate assembling through the panels about the edges of the panel 9. Of course, all of the edges of the panel 9 may be equipped with similar strips and adjoining panels with other strips, but when a mold wall is composed of many panels I find that the panels can be more rapidly and accurately assembled if equipped as shown in Fig. 6.

At suitable intervals along the edges of the walls or panels are arranged fasteners comprising opposed bracket members 10 and 11. The bracket member 10 may abut the edge of the strip member 4 and said bracket member has an apertured lug 12 and slotted spaced apart arms 13. The bracket member 11 has an apertured lug 14 and a single slotted arm 15 adapted to extend between the arms 13 so that portions of the slots of said arms may aline and permit of a wedge or key 16 being driven in the slots of the arms 13 and 15 to draw the bracket members 10 and 11 towards each other. The wedge or key 16 may be in various forms so that it cannot become accidentally disengaged from the bracket arms and by driving the wedge into said arms the interlocking strip members 4 and 5 will be drawn together until the edges of the walls 1 and 2 actually abut and form a good joint.

On the bracket arm 15 is an apertured lug 17 alining with the lug 14 and in said lugs is a pin 18 having a tapered end 19 adapted to enter the apertured lug 12. This pin is adapted to secure the bracket members 10 and 11 in opposed relation and assist in shifting the mold wall to establish such bracket relation should one mold wall be laterally displaced relative to the other. The tapered end 19 of the pin 18 assists in shifting the mold wall and its bracket relative to the pin carrying bracket.

To prevent the pin 18 from becoming accidentally displaced relative to the apertured lugs 14 and 17, said pin has a stop pin 20 between the lugs 14 and 17.

In using these fasteners for securing adjoining walls or panels together it is preferable to arrange the same as shown in Fig. 6 where two single arm brackets and two double arm brackets are used on a single panel with the single arm brackets opposite the double arm brackets.

In Fig. 5 I show mold walls or panels assembled and articulated to form a mold cavity 21 adapted to receive plastic material for the formation of a concrete wall or the like and it will be noted that the mold panels composing each mold wall are locked together so that the panels will provide smooth inner faces. It is practically impossible for one panel to become laterally displaced relative to adjoining panels and it is by virtue of the panels that the panels can be quickly assembled and just as readily disassembled so that the panels may be repeatedly used in the formation of concrete structures.

Somewhat similar wall or panel fasteners are disclosed in my pending application for mold forms filed Feb. 9, 1925, Serial No. 7,878 and allowed Feb. 28, 1926. This application may be considered a division of the subject matter disclosed in my former application.

What I claim is:—

1. The combination of mold walls placed edge to edge, fastener brackets adjacent the edges of said mold walls, slotted arms carried by said brackets, and a wedge extending through said slotted arms and adapted for drawing said brackets towards each other.

2. The combination called for in claim 1, wherein the bracket arms are three in number with one of said bracket arms extending between the other two.

3. The combination called for in claim 1, and a centering pin carried by one of said brackets and adapted to enter the other bracket.

In testimony whereof I affix my signature.

FRANK J. GREMEL.